United States Patent
Fan et al.

(10) Patent No.: US 7,029,751 B2
(45) Date of Patent: Apr. 18, 2006

(54) ISOTOPE-DOPED CARBON NANOTUBE AND METHOD AND APPARATUS FOR FORMING THE SAME

(75) Inventors: Shou-Shan Fan, Beijing (CN); Liang Liu, Beijing (CN)

(73) Assignees: Tsinghua University, Beijing (CN); Hon Hai Precision Ind. Co., Ltd., Taipei Hsien (TW)

( * ) Notice: Subject to any disclaimer, the term of this patent is extended or adjusted under 35 U.S.C. 154(b) by 111 days.

(21) Appl. No.: 10/402,701

(22) Filed: Mar. 28, 2003

(65) Prior Publication Data

US 2004/0101685 A1 May 27, 2004

(30) Foreign Application Priority Data

Nov. 27, 2002 (CN) ................ 02152098 A

(51) Int. Cl.
*B32B 5/16* (2006.01)
(52) U.S. Cl. ................ 428/402; 428/403; 977/DIG. 1
(58) Field of Classification Search ............. 428/403
See application file for complete search history.

(56) References Cited

U.S. PATENT DOCUMENTS

| | | | |
|---|---|---|---|
| 4,946,370 A * | 8/1990 | Yoshimoto et al. | 427/249.6 |
| 5,358,802 A * | 10/1994 | Mayer et al. | 429/231.8 |
| 5,753,088 A | 5/1998 | Olk | |
| 5,773,834 A | 6/1998 | Yamamoto et al. | |
| 6,139,919 A * | 10/2000 | Eklund et al. | 427/430.1 |
| 6,183,714 B1 | 2/2001 | Smalley et al. | |
| 6,232,706 B1 | 5/2001 | Dai et al. | |
| 6,706,402 B1 * | 3/2004 | Rueckes et al. | 428/408 |
| 2005/0191417 A1 * | 9/2005 | Fan et al. | 427/248.1 |

OTHER PUBLICATIONS

Zidan et al, "Doped Carbon Nanotubes for Hydrogen Storage", DOE Hydrogen Program Review, 2002.*
Chen et al, "Chemical Doped Double-Walled Carbon Nanotubes: Cylindrical Molecular Capacitors", Phys. Rev. Letters, vol. 90, No. 25, 257403, Jun. 2003.*

(Continued)

*Primary Examiner*—H. Thile
(74) *Attorney, Agent, or Firm*—Wei Te Chung

(57) ABSTRACT

An isotope-doped carbon nanotube (40) includes a plurality of first carbon nanotube segments (402) having carbon-12 isotopes and a plurality of second carbon nanotube segments (404) having carbon-13 isotopes. The first and second carbon nanotube segments are alternately arranged along a longitudinal direction of the carbon nanotube. Three preferred methods employ different isotope sources to form isotope-doped carbon nanotubes. In a chemical vapor deposition method, different isotope source gases are alternately introduced. In an arc discharge method, a power source is alternately switched between different isotope anodes. In a laser ablation method, a laser is alternately focused on different isotope targets. In addition, an apparatus for implementing the preferred methods is provided.

15 Claims, 2 Drawing Sheets

OTHER PUBLICATIONS

Maruyama et al., "Effect of carbon isotope abundance on thermal conductivity and Raman scattering of single-walled carbon nanotubes", The International of Symposium on Micro-Mechanical Engineering, ISMME2003-109, 2003.*

Fan et al., "Monitoring the growth of carbon nanotubes by carbon isotope labelling", Nanotechnology 14 (2003) 1118-1123.*

Fuhrer et al., "Carbon Isotope Effect in Single-Crystal Rb3C60", Physical Review Letters, vol. 83, No. 2, 1999, 404-407.*

W.Z. Li, S. S. Xie, L. X. Qian, B. H. Chang, B. S. Zou, W. Y.. Zhou, R. A. Zhao, G. Wang, "Large-scale synthesis of aligned carbon nanotubes", Science, Dec. 6, 1996, p. 1701-1703, vol. 274.

* cited by examiner

ISOTOPE-DOPED CARBON NANOTUBE AND METHOD AND APPARATUS FOR FORMING THE SAME

BACKGROUND OF THE INVENTION

1. Field of the Invention

This invention relates to nano-materials and methods and apparatuses for forming nano-materials, and more particularly to isotope-doped carbon nanotubes and a method and an apparatus for forming the same.

2. Description of the Prior Art

Carbon nanotubes were discovered by S. Ijima (Nature, vol. 354, pp. 56–58, 1991) and synthesized by T. W. Ebbesen and P. M. Ajayan (Nature, vol. 358, pp. 220–222, 1992). Theoretical studies showed that carbon nanotubes exhibit either metallic or semiconductive behavior depending on the radii and helicity of the tubules. Carbon nanotubes have interesting and potentially useful electrical and mechanical properties, and offer potential for use in electronic devices. Carbon nanotubes also feature high aspect ratios (>1000) and atomically sharp tips, which make them ideal candidates for electron field emitters, white light sources, lithium secondary batteries, hydrogen storage cells, transistors and cathode ray tubes (CRTs).

Carbon nanotubes are currently being produced by a variety of different techniques such as arc discharge (See S. Iijima et al, Nature, Helical Microtubules of Graphitic Carbon, vol. 354, pp. 56–58, 7 Nov. 1991), laser ablation (See T. W. Ebbesen and P. M. Ajayan, Large-scale Synthesis of Carbon Nanotubes, Nature, vol. 358, pp. 220–222, 16 Jul. 1992) and chemical vapor deposition (CVD) (See W. Z. Li et al., Large-scale Synthesis of Aligned Carbon Nanotubes, Science, vol. 274, pp. 1701–1703, Dec. 6, 1996). All of the above-mentioned disclosures are incorporated herein by reference.

Isotope labeling is a powerful tool in the study of nano-material growth mechanisms and in nano-sized isotope junction synthesis. Methods of isotope labeling use reactants containing different isotopes of a special element (usually light elements such as carbon, boron, nitrogen and oxygen), which are fed in designated concentrations (pure or mixed) and sequences into nano-material synthesis process to provide in situ isotope labeling of nano-materials.

None of the three above-described techniques for producing carbon nanotubes, namely arc discharge, laser ablation and CVD, provides isotope-doped carbon nanotubes or a method for making isotope-doped carbon nanotubes.

SUMMARY OF THE INVENTION

Accordingly, an object of the present invention is to provide isotope-doped carbon nanotubes.

Another object of the present invention is to provide various methods for forming isotope-doped carbon nanotubes.

A further object of the present invention is to provide at least one apparatus for forming isotope-doped carbon nanotubes.

In order to achieve the first above-mentioned object, an isotope-doped carbon nanotube in accordance with the present invention comprises a plurality of first carbon nanotube segments having carbon-12 isotopes and a plurality of second carbon nanotube segments having carbon-13 isotopes. The first and second carbon nanotube segments are alternately arranged along a longitudinal direction of the carbon nanotube.

In order to achieve the second above-mentioned object, a first preferred method of the present invention for forming isotope-doped carbon nanotubes comprises: providing a first and a second carbon source gas respectively comprising carbon-12 and carbon-13 isotopes; putting a substrate having a catalyst film deposited thereon into a reaction chamber; creating a vacuum in the reaction chamber, introducing a protecting gas at a predetermined pressure therein, and heating the reaction chamber up to a predetermined temperature; introducing the carbon-12 source gas into the reaction chamber, whereby first carbon nanotube segments are formed on the catalyst film; after a given time, shutting off the flow of carbon-12 source gas and introducing the carbon-13 source gas into the reaction chamber, whereby second carbon nanotube segments are formed on the first carbon nanotube segments; and after a given time, shutting off the flow of carbon-13 source gas and cooling the reaction chamber down to room temperature, whereby isotope-doped carbon nanotubes are formed.

In order to achieve the second above-mentioned object, a second preferred method of the present invention for forming isotope-doped carbon nanotubes comprises: providing first and second carbon rods respectively comprising carbon-12 and carbon-13 isotopes, and respectively connecting the first and second carbon rods through a multi-position switch to a positive terminal of an electric arc discharge supply; connecting a pure graphite rod to a negative terminal of the electric arc discharge supply; placing the first and second carbon rods adjacent the pure graphite rod to create an arc gap, putting all the rods into an arc discharge reaction chamber, creating a vacuum in the reaction chamber, and introducing a protecting gas at a predetermined pressure therein; applying a discharge current between the first carbon rod and the graphite rod, whereby first carbon nanotube segments are formed on the graphite rod; after a given time, applying a discharge current between the second carbon rod and the graphite rod, whereby second carbon nanotube segments are formed on the first carbon nanotube segments; and after a given time, switching off the electric arc discharge supply, whereby isotope-doped carbon nanotubes are formed.

In order to achieve the second above-mentioned object, a third preferred method of the present invention for forming isotope-doped carbon nanotubes comprises: providing first and second carbon targets respectively comprising carbon-12 and carbon-13 isotopes; providing a carbon nanotube accumulator; putting the first and second carbon targets and the accumulator into a laser ablation reaction chamber, with the accumulator placed behind the first and second carbon targets; creating a vacuum in the reaction chamber, and introducing a protecting gas at a predetermined pressure therein; heating a region in the vicinity of the first and second carbon targets up to a predetermined temperature; focusing a laser beam on the first carbon target, whereby first carbon nanotube segments are formed on the accumulator; after a given time, focusing the laser beam on the second carbon target, whereby second carbon nanotube segments are formed on the first carbon nanotube segments; and after a given time, switching off the laser beam, whereby isotope-doped carbon nanotubes are formed.

In order to achieve the third above-mentioned object, an apparatus of the present invention for forming isotope-doped carbon nanotubes comprises a reaction chamber with at least one gas supply conduit and at least one gas exhaust conduit, at least one energy supply device, first and second carbon sources respectively comprising first and second carbon isotopes, a carbon nanotube forming medium, and a switching device. The switching device can selectively switch between the first carbon source and the second carbon source in order to make the first carbon source and the second carbon source deposit on the carbon nanotube forming medium alternately.

Other objects, advantages and novel features of the present invention will be drawn from the following detailed description of preferred embodiments of the present invention with the attached drawings, in which:

DETAILED DESCRIPTION OF THE PREFERRED EMBODIMENTS

The present invention is further described below and by reference to the figures.

Figure 1:
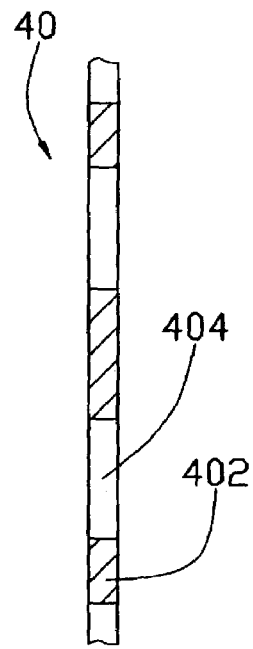
FIG. 1 is a schematic side elevation view of an isotope-doped carbon nanotube of the present invention.

Referring to FIG. 1, an isotope-doped carbon nanotube 40 in accordance with the present invention comprises a plurality of first carbon nanotube segments 402 having carbon-12 isotopes and a plurality of second carbon nanotube segments 404 having carbon-13 isotopes. The first and second carbon nanotube segments 402, 404 are alternately arranged along a longitudinal direction of the carbon nanotube 40. In a preferred embodiment of the present invention, the carbon nanotube 40 has a length of 10~1000 µm and a diameter of 0.5~50 nm.

Figure 2:
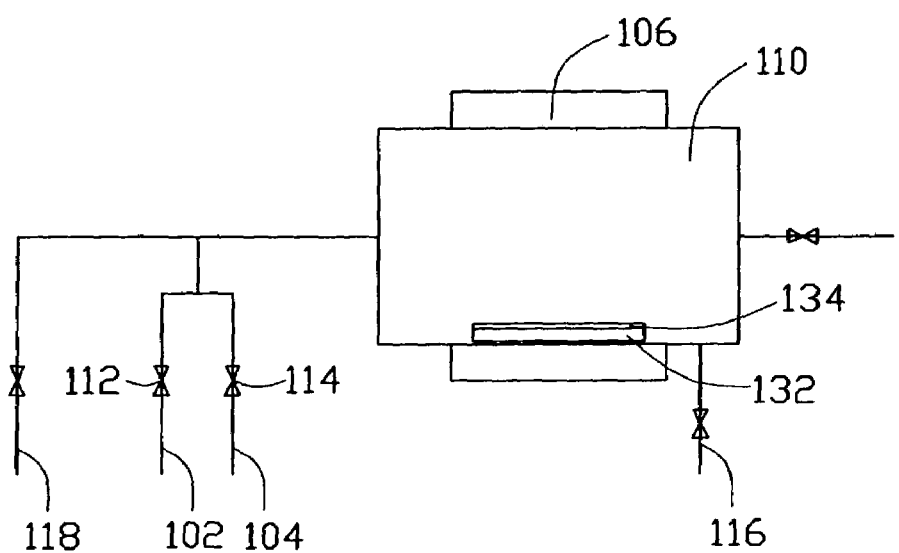
FIG. 2 is a schematic diagram of an apparatus used to form isotope-doped carbon nanotubes in accordance with a first preferred method of the present invention.

A first preferred method of the present invention for forming a plurality of the carbon nanotubes 40 involves chemical vapor deposition. Referring to FIG. 2, said chemical vapor deposition method comprises the following steps. By performing the following steps, isotope-doped carbon nanotubes each having only one first carbon nanotube segment 402 and only one second carbon nanotube segment 404 can be formed:

(1) providing two different ethylene gases respectively comprising carbon-12 isotopes and carbon-13 isotopes;
(2) putting a substrate 132 into a reaction chamber 110, the substrate 132 having an iron thin film 134 deposited thereon, the iron thin film 134 being 5 nm thick and functioning as a catalyst;
(3) creating a vacuum in the reaction chamber 110 via a gas exhaust conduit 116, introducing argon gas at a pressure of 1 atmosphere into the reaction chamber 110 through a gas supply conduit 118, and heating the reaction chamber 110 up to 650~750° C. using a reaction furnace 106 disposed around the reaction chamber 110;
(4) opening a valve 112 and introducing ethylene gas having carbon-12 isotopes into the reaction chamber 110 through a gas supply pipe 102 at a flow rate of 120 sccm (standard cubic centimeters per minute), leaving first carbon nanotube segments (not shown) having carbon-12 isotopes formed on the iron thin film 134;
(5) after a given time when the first carbon nanotube segments having carbon-12 isotopes have reached a first desired length, closing the valve 112, and opening a valve 114 and introducing ethylene gas having carbon-13 isotopes into the reaction chamber 110 through a gas supply pipe 104 at a flow rate of 120 sccm, leaving second carbon nanotube segments (not shown) having carbon-13 isotopes formed on said first carbon nanotube segments;
(6) after a given time when the second carbon nanotube segments having carbon-13 isotopes have reached a second desired length, closing the valve 114 to stop the flow of ethylene gas having carbon-13 isotopes and cooling the reaction chamber 110 down to room temperature, leaving isotope-doped carbon nanotubes formed on the substrate 132.

It is to be understood that after performing step (5), step (4) may be repeated to form carbon nanotubes each having two said first carbon nanotube segments and one said second carbon nanotube segment. Similarly, steps (4) and (5) may respectively be repeated a desired number of times to form the carbon nanotubes 40 each having the first and second carbon nanotube segments 402, 404 alternately arranged therein.

In alternative embodiments of the first preferred method, other metals such as cobalt, nickel or the like can be used as the catalyst instead of iron. Other carbon hydrogen compounds such as methane, ethyne or propadiene can be used as the carbon source gas instead of ethylene. Other gases such as helium, nitrogen or hydrogen can be used as the protecting gas instead of argon.

Figure 3:
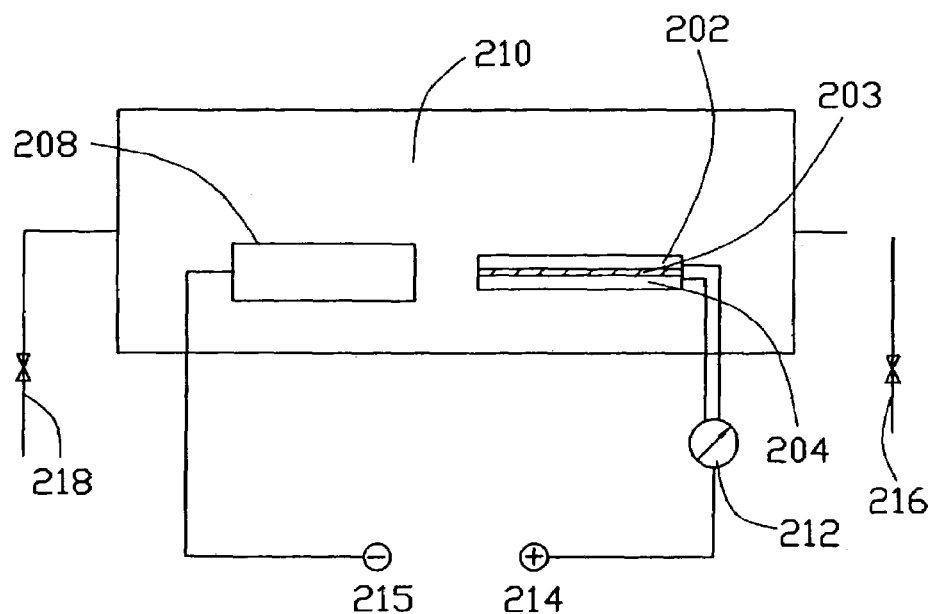
FIG. 3 is a schematic diagram of an apparatus used to form isotope-doped carbon nanotubes in accordance with a second preferred method of the present invention.

A second preferred method of the present invention for forming a plurality of the isotope-doped carbon nanotubes 40 involves arc discharge. Referring to FIG. 3, said arc discharge method comprises the following steps. By performing the following steps, isotope-doped carbon nanotubes each having only one first carbon nanotube segment 402 and only one second carbon nanotube segment 404 can be formed:

(1) providing a first carbon rod 202 comprising carbon-12 isotopes and having a diameter of 8~12 mm, the first carbon rod 202 being formed by pressing a composite powder and high purity graphite particles at a pressure of 3300~3800 atmospheres, each particle having a diameter of 5 µm and being carbon-12 isotope graphite, the composite powder functioning as a catalyst and comprising nickel powder (0~13% by weight) and/or ytterbia powder (0~48% by weight), providing a second carbon rod 204 comprising carbon-13 isotopes and having a diameter of 8~12 mm, the second carbon rod 204 being formed in the same way wit the same composite powder as the first carbon rod 202 is formed but using high purity graphite particles of carbon-13 isotopes, bonding the first and second carbon rods 202, 204 with an adhesive insulator 203 therebetween, and respectively connecting the first and second carbon rods 202, 204 to two load-side contacts of a switch 212, a supply-side contact of the switch 212 being connected to a positive terminal 214 of an electric arc discharge supply, the first and second carbon rods 292, 204 functioning in turn as an anode;
(2) connecting a pure graphite rod 208 to a negative terminal 215 of the electric arc discharge supply, the pure graphite rod 208 functioning as a cathode 208;
(3) placing the anodes 202, 204 adjacent the cathode 208 to create an arc gap of 1.5~2 mm, putting the anodes 202, 204 and cathode 208 into an arc discharge reaction chamber 210, creating a vacuum in the reaction chamber 210 via a gas exhaust conduit 216, and introducing helium gas at a pressure of 100~500 Torr into the reaction chamber 210 through a gas supply conduit 218;

(4) switching the switch 212 to connect the first carbon rod 202 with the positive terminal 214, and applying a discharge voltage of 20~40V and a discharge current of 90~110A between the anode 202 and the cathode 208, leaving first carbon nanotube segments (not shown) having carbon-12 isotopes formed on the cathode 208;

(5) after a given time when the first carbon nanotube segments having carbon-12 isotopes have reached a first desired length, switching the switch 212 to disconnect the first carbon rod 202 while at the same time connecting the second carbon rod 204, and applying a discharge voltage of 20~40V and a discharge current of 90~110A between the anode 204 and the cathode 208, leaving second carbon nanotube segments (not shown) having carbon-13 isotopes formed on said first carbon nanotube segments; and (6) after a given time when the second carbon nanotube segments having carbon-13 isotopes have reached a second desired length, switching off the electric arc discharge supply, leaving isotope-doped carbon nanotubes formed on the cathode 208.

It is to be understood that after performing step (5), step (4) may be repeated to form carbon nanotubes each having two said first carbon nanotube segments and one said second carbon nanotube segment. Similarly, steps (4) and (5) may respectively be repeated a desired number of times to form the carbon nanotubes 40 each having the first and second carbon nanotube segments 402, 404 alternately arranged therein.

In alternative embodiments of the second preferred method, other suitable materials such as pure cobalt powder, pure nickel powder or the like can be used as the catalyst and pressed with the graphite particles. Other gases such as argon, nitrogen or hydrogen can be used as the protecting gas instead of helium. Furthermore, a cooling pipe can be attached around the arc discharge reaction chamber 210 to avoid excessive build-up of heat therein.

Figure 4:
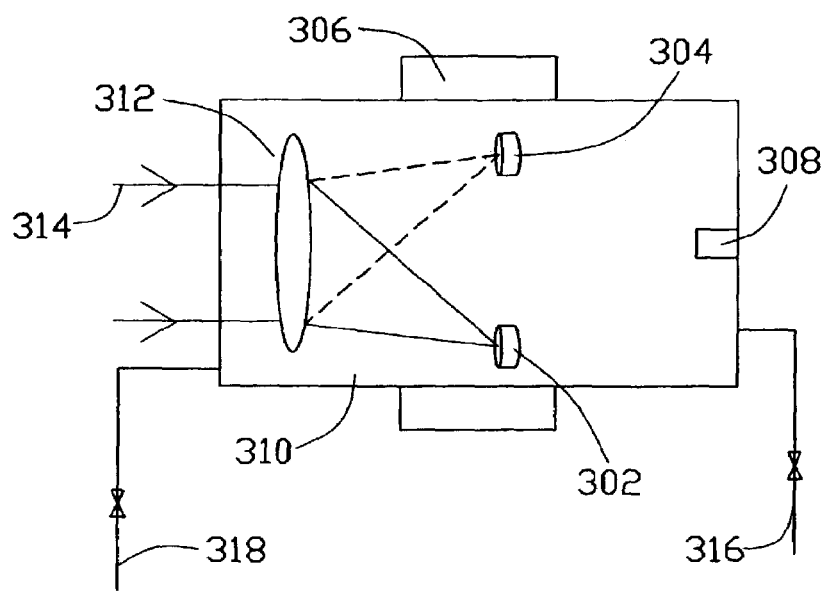
FIG. 4 is a schematic diagram of an apparatus used to form isotope-doped carbon nanotubes in accordance with a third preferred method of the present invention.

A third preferred method of the present invention for forming a plurality of the isotope-doped carbon nanotubes 40 involves laser ablation. Referring to FIG. 4, said laser ablation method comprises the following steps. By performing the following steps, isotope-doped carbon nanotubes each having only one first carbon nanotube segment 402 and only one second carbon nanotube segment 404 can be formed:

(1) providing a first carbon target 302 comprising carbon-12 isotopes, the first carbon target 302 being formed by pressing a composite powder together with a high purity graphite powder of carbon-12 isotopes, the composite powder functioning as a catalyst and comprising cobalt powder (2.8% by weight) and nickel powder (2.8% by weight), and providing a second carbon target 304 comprising carbon-13 isotopes, the second carbon target 304 being formed in the same way with the same composite powder as the first carbon target 302 is formed but using high purity graphite powder of carbon-13 isotopes;

(2) providing a carbon nanotube accumulator 308;

(3) putting the first and second targets 302, 304 and the accumulator 308 into a laser ablation reaction chamber 310, with the accumulator 308 being placed behind the first and second targets 302, 304;

(4) creating a vacuum in the reaction chamber 310 via a gas exhaust conduit 316, and introducing argon gas at a pressure of 50–760 Torr into the reaction chamber 310 through a gas supply conduit 318;

(5) heating a region in the vicinity of the first and second targets 302, 304 up to 1000~1200° C. using a heater 306;

(6) focusing a pulsing laser beam 314 of a laser (not shown) on the first target 302 using a lens 312 located in front of the first and second targets 302, 304, the pulsing laser beam 314 having a wavelength of 532 nm and a single pulsing energy of 250 mJ, a diameter of a spot of irradiation on the first target 302 being 5 mm, leaving first carbon nanotube segments (not shown) having carbon-12 isotopes formed on the accumulator 308;

(7) after a given time when the first carbon nanotube segments having carbon-12 isotopes have reached a first length, switching the lens 312 to focus the laser beam 314 on the second target 304, leaving second carbon nanotube segments (not shown) having carbon-13 isotopes formed on said first carbon nanotube segments; and (8) after a given time when the second carbon nanotube segments having carbon-13 isotopes have reached a second length, switching off the pulsing laser beam 314, leaving isotope-doped carbon nanotubes formed on the accumulator 308.

It is to be understood that after performing step (7), step (6) may be repeated to form carbon nanotubes each having two said first carbon nanotube segments and one said second carbon nanotube segment. Similarly, steps (6) and (7) may respectively be repeated a desired number of times to form the carbon nanotubes 40 each having the first and second carbon nanotube segments 402, 404 alternately arranged therein.

In alternative embodiments of the third preferred method, other suitable materials such as pure cobalt powder, pure nickel powder or the like can be used as the catalyst and pressed with the graphite powder. Other gases such as helium, nitrogen or hydrogen can be used as the protecting gas instead of argon. In addition, the laser beam may be focused on the respective first and second targets 302, 304 by mounting the first and second targets 302, 304 on a rotatable member and rotating the rotatable member to exchange locations of the first and second targets 302, 304.

The preferred methods of the present invention can form multiple isotope-doped carbon nanotubes 40, each comprising the first and second carbon nanotube segments 402, 404 alternately arranged along the longitudinal direction of the carbon nanotube 40. Accordingly, the growth pattern of different carbon isotopes can be recorded in situ by micro-Raman spectroscopy. Further, the growth mechanisms of carbon nanotubes can be investigated in this way. Moreover, the preferred methods can be employed to form one-dimensional nano-materials containing isotopes other than those of pure carbon; for example, isotopes of light element compositions including boron, nitrogen or oxygen.

It will be understood that the particular methods of the present invention are shown and described by way of illustration only, and not as limiting the invention. The principles and features of the present invention may be employed in various and numerous embodiments thereof without departing from the scope of the invention.

What is claimed is:

1. An isotope-doped carbon nanotube comprising:
   at least one first carbon nanotube segment comprising first carbon isotopes; and
   at least one second carbon nanotube segment comprising second carbon isotopes;
   wherein the first and second carbon nanotube segments are arranged one on another along a longitudinal direction of the carbon nanotube.

2. The carbon nanotube of claim 1, wherein to first and second segments comprise carbon-12 isotopes and carbon-13 isotopes, respectively.

3. The carbon nanotube of claim 1, wherein a length of the carbon nanotube is in the range from 10 to 1000 micrometers.

4. The carbon nanotube of claim 1, wherein a diameter of the carbon nanotube is in the range from 0.5 to 50 nanometers.

5. An isotope-doped carbon nanotube, comprising;
a plurality of first carbon nanotube segments each essentially composed of first carbon isotopes; and
a plurality of second carbon nanotube segments each essentially composed of second carbon isotopes; wherein
said first carbon nanotube segments and said second carbon nanotube segments are arranged in an alternate format along a longitudinal direction of the isotope-doped carbon nanotube; and
said first carbon isotopes and said second carbon isotopes are used as labels to identify or measure a growth rate of the isotope-doped carbon nanotube.

6. An isotope-doped carbon nanotube comprising:
an elongated tube structure including at least a first nanotube segment made of first carbon isotopes and a second nanotube segment made of second carbon isotopes along an axial direction of said elongated tube structure.

7. The isotope-doped carbon nanotube of claim 6, wherein said first nanotube segment is spaced from said second nanotube segment a distance.

8. The isotope-doped carbon nanotube of claim 6, wherein said first nanotube segment is longer than said second nanotube segment along said axial direction.

9. The isotope-doped carbon nanotube of claim 6, wherein said first nanotube segment defines an axial length essentially similar to that of said second nanotube segment.

10. The isotope-doped carbon nanotube of claim 6, wherein said first nanotube segment defines a diameter essentially similar to that of said second nanotube segment.

11. A nanotube having carbon as a base material, comprising:
an elongated tube structure defining a first section and a second section along an axial direction thereof; wherein the first section is essentially composed of a first isotope of carbon, and the second section is essentially composed of a second isotope of carbon.

12. The nanotube of claim 11, wherein the first section is spaced from the second section a distance.

13. The nanotube of claim 11, wherein the first section is longer than the second section along said axial direction.

14. The nanotube of claim 11, wherein the first section defines an axial length essentially similar to that of the second section.

15. The nanotube of claim 11, wherein the first section defines a diameter essentially similar to that of the second section.

* * * * *